United States Patent
Hibino

[11] Patent Number: 6,071,327
[45] Date of Patent: Jun. 6, 2000

[54] METHOD OF SEPARATING IODINE GAS

[75] Inventor: Kouetsu Hibino, Nisshin, Japan

[73] Assignee: Toyota Jidosha Kabushiki Kaisha, Toyota, Japan

[21] Appl. No.: 09/168,675

[22] Filed: Oct. 9, 1998

[30] Foreign Application Priority Data

Oct. 13, 1997 [JP] Japan .................................. 9-278930

[51] Int. Cl.[7] .................................................. B01D 53/22
[52] U.S. Cl. ........................................ 95/52; 95/54; 95/55
[58] Field of Search .................... 95/45, 47, 52, 95/54

[56] References Cited

U.S. PATENT DOCUMENTS

| | | | |
|---|---|---|---|
| 3,651,618 | 3/1972 | Klein et al. ............................. | 95/45 X |
| 4,955,993 | 9/1990 | Sanders, Jr. et al. ...................... | 95/54 |
| 5,169,412 | 12/1992 | Prasad et al. ............................ | 95/52 X |
| 5,226,932 | 7/1993 | Prasad ................................... | 95/45 |
| 5,383,956 | 1/1995 | Prasad et al. ............................ | 95/45 |
| 5,709,791 | 1/1998 | Hibino et al. ........................... | 205/464 |

FOREIGN PATENT DOCUMENTS

| | | | |
|---|---|---|---|
| 0385947 | 9/1990 | European Pat. Off. .................... | 95/45 |
| 0430304 | 6/1991 | European Pat. Off. .................... | 95/52 |
| 55-21587 | 2/1980 | Japan . | |
| 61-146319 | 7/1986 | Japan ...................................... | 95/47 |
| 8-301606 | 11/1996 | Japan . | |

*Primary Examiner*—Robert Spitzer
*Attorney, Agent, or Firm*—Finnegan, Henderson, Farabow, Garrett & Dunner, L.L.P.

[57] ABSTRACT

A method of separating iodine gas by passing a phase containing iodine gas through a hydrophobic separation membrane containing pores having a pore diameter of 1 nm to 60 $\mu$m, retaining iodine gas on the upstream side of the flow of the phase in the separation membrane, and removing the phase from which iodine gas has been removed from the downstream side of the separation membrane. In addition, a membrane that is impermeable to water but permeable to steam is used in combination with this separation membrane.

8 Claims, 3 Drawing Sheets

METHOD OF SEPARATING IODINE GAS

BACKGROUND OF THE INVENTION

1. Field of the Invention

The present invention relates a method of separating iodine gas, and more particularly, the present invention relates to a method of separating iodine gas from a phase by passing a phase containing iodine gas through a membrane impermeable to iodine gas.

2. Description of the Related Art

Because hydrogen and oxygen are attracting attention as clean sources of energy, a method by which water is broken down electrochemically has been established for their production on an industrial scale. However, this method has problems in terms of cost since it requires a large amount of electrical power. In order to solve this problem, a method has been proposed for chemically decomposing water in Japanese Unexamined Patent Publication No. 55-21587 and Japanese Unexamined Patent Publication No. 8-301606.

Namely, as is represented by the following formula (1):

$$H_2O + X_2 \rightarrow HX + 1/2 O_2 \qquad (1)$$

(wherein, X is a halogen), water is reacted with halogen to form hydrogen halide and oxygen by a chemical reaction, after which the hydrogen halide is electrically decomposed to form hydrogen. According to this method, since oxygen is obtained by a chemical reaction and hydrogen is obtained at a much lower voltage as a result of electrically decomposing hydrogen halide instead of electrically decomposing water directly, it offers the advantage of being able to reduce the amount of electrical energy required.

Although oxygen and hydrogen can be obtained at low cost with this type of method, there are problems in the step of isolating the oxygen and hydrogen halide from the reaction system containing halogen. Namely, since the pressure increases resulting in a dangerous situation, it is difficult for the reaction to proceed unless the formed gas is removed from the reaction system either continuously or in batches. However, since unreacted halogen is also contained in the reaction system in addition to the formed oxygen and hydrogen halide, it is necessary to remove only oxygen and hydrogen halide from the reaction system while continuing to hold the halogen in the system.

In the case of using bromine as the halogen, if a pipe that removes gas from the reaction system is cooled, although the water and bromine liquefy, the oxygen and hydrogen halide will remain in the gaseous state. Consequently, the formed oxygen and hydrogen halide can easily be separated from the bromine, allowing only gas to be removed. However, in the case of using iodine as the halogen, if a pipe for removing gas is cooled similar to the case of using bromine, since the melting point of iodine is 117° C., the iodine solidifies and ends up clogging the pipe at a temperature at which water liquefies. In addition, even if a general gas separation membrane is used, iodine gas passes through this membrane, thereby not being separated from the oxygen and hydrogen halide.

In the case of using iodine as the halogen in the above-mentioned method of (1), since the resulting hydrogen iodide can be decomposed into hydrogen and iodine by heat alone without requiring electrical decomposition, it offers the advantage of having high thermal efficiency as a method of obtaining hydrogen. However, since it was not possible in the past to separate the oxygen, hydrogen halide and iodine gas as described above, the above-mentioned reaction of (1) could not be carried out continuously, but only in batches. Therefore, there is a need for a means of effectively separating iodine gas so that the above-mentioned method of (1) can be performed continuously.

SUMMARY OF THE INVENTION

According to a first invention to solve the above-mentioned problems, iodine gas is separated by passing a phase containing iodine gas through a hydrophobic separation membrane containing pores having a pore diameter of 1 nm to 60 μm, retaining iodine gas on the upstream side of the flow of said phase through said separation membrane, and removing the phase from which iodine gas has been removed from the downstream side of said separation membrane.

In addition, in a second invention to solve the above-mentioned problems, a water-impermeable, steam-permeable membrane is also provided in addition to said separation membrane in the first invention.

In addition, in a third invention to solve the above-mentioned problems, an inert gas is blown onto the surface on the upstream side of said separation membrane in either the first or second invention.

In addition, in a fourth invention to solve the above-mentioned problems, steam is passed from the downstream side towards the upstream side of said separation membrane in either the first or second invention.

DETAILED DESCRIPTION OF THE PREFERRED EMBODIMENTS

Figure 1:
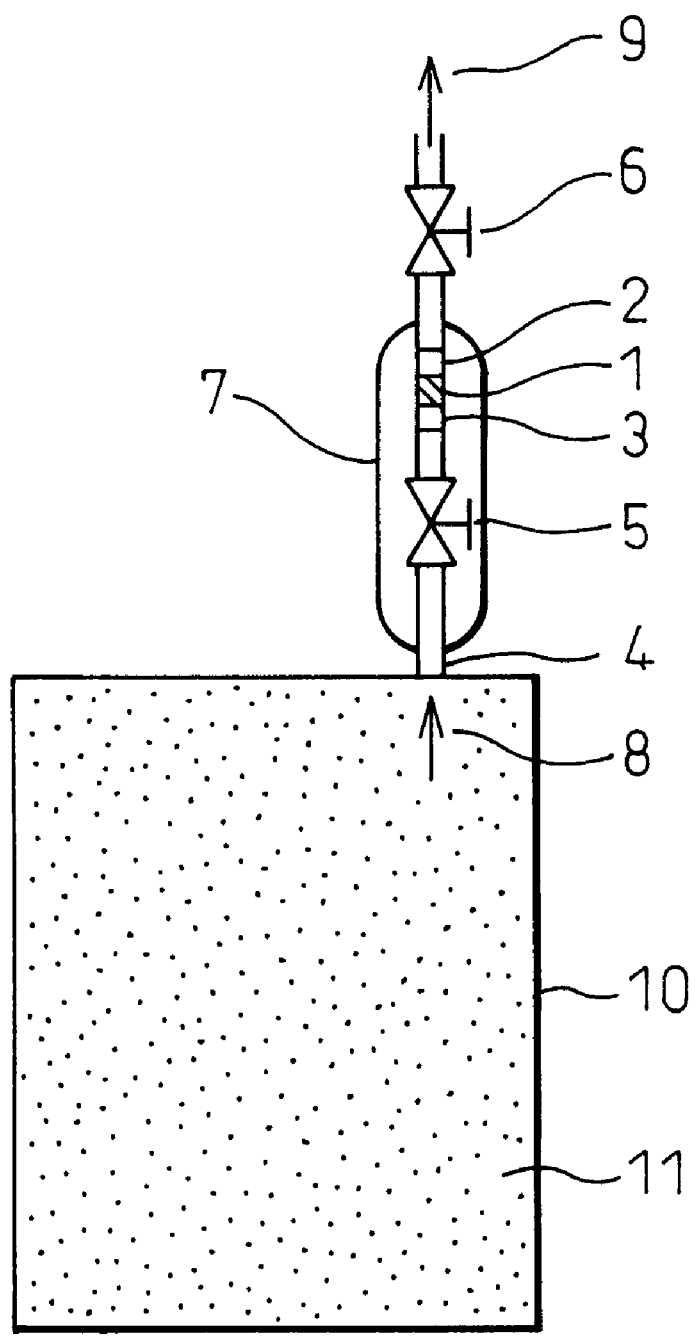
FIG. 1 is a schematic cross-sectional view of an apparatus used in the method of the present invention.

The following provides an explanation of the present invention with reference to the drawings. FIG. 1 is a cross-sectional view of an apparatus for carrying out the method of the present invention. 25 g of iodine is added to sealed container 10 to form a mixed gas 11 of iodine and air. After heating to bring the inside temperature of the sealed container to 160° C., valves 5 and 6 are opened, intake gas 8 containing iodine is passed through separation membrane 1 through pipe 4, and outlet gas 9 is collected. This separation membrane 1 is secured by metal or ceramic porous plates 2 and 3 (pore size: 60 μm). The pressure when the valves are opened is approximately 0.2 MPa (2 kg/cm²), and gas is collected with the valves open until the pressure falls to 0.1 MPa (1 kg/cm²) Furthermore, since iodine ends up adhering to the inside of the pipe causing the pipe to become clogged if the temperature of the pipe falls below the melting point of iodine, the temperature of the pipe is adjusted with heater 7.

The present invention is characterized by the use of a hydrophobic membrane containing pores having a pore diameter of 1 nm to 60 μm and preferably 1–3 μm. A fluororesin such as polyethylene tetrafluoride, which itself is hydrophobic, may be used for the membrane. Alternatively, a water-repellent membrane based on $SiO_2$ may be formed by coating a hydrophobic resin such as a fluororesin onto a porous material such as a metal (hastelloy or stainless steel, etc.), a ceramic, a glass filter or a foam material, or by the so-called sol-gel method. More specifically, after mixing 10.0 g of tetraethylorthosilicate, 2.73 g of FAS and 13.27 g of ethyl alcohol and stirring for 2 hours, 4.25 g of pure water and 5.27 g of 0.1 N hydrochloric acid are added to prepare a sol solution. After allowing this sol solution to stand for 24 hours, a flat glass plate is immersed in this solution. After drying for 30 minutes at 40° C., a separation membrane having water repellence is obtained by baking for 1 hour at 200° C.

Although the hydrophobicity of the separation membrane in the present invention should have a surface contact angle of at least 90 degrees, since this contact angle gradually decreases due to the effects of heat, iodine gas and hydrogen iodide, the greater the contact angle the better. For example, the contact angle of polyethylene tetrafluoride is 117 degrees, and the contact angle of the above-mentioned flat glass plate can be raised to 140 degrees or more by forming a water-repellent membrane.

Since iodine gas is not contained in the outlet gas 9 that has passed through separation membrane 1, iodine gas can be trapped by the method of the present invention. Although iodine gas passes through general gas separation membranes of the prior art, by making this membrane hydrophobic as described above, permeation of iodine gas can be prevented. In addition, although the diameter of iodine gas is approximately 0.5 nm, even if this separation membrane has pores of about 60 μm, if it is hydrophobic, the iodine gas is unable to permeate this membrane. Although the reason why iodine gas is unable to even permeate a membrane having a pore size 1000 times its diameter is unclear, it is believed to be due to interaction between the hydrophobicity (or water repellence) of the membrane surface and the iodine gas. On the other hand, this type of iodine gas separation effect cannot be obtained when using a polyimide membrane, metal filter or ceramic filter having a low degree of hydrophobicity even thought it contains pores of about the same pore diameter.

In addition, in the constitution shown in FIG. 1, in place of mixed gas 11 composed of iodine gas and air, a solution composed of 5 g of iodine, 90 g of water and 5 g of 47% hydrogen iodide is placed in the sealed container, and after the inside temperature of the container reaches 160° C., valves 5 and 6 are opened and the gas is collected. In this case as well, the effect is obtained of iodine not being present in tile outlet gas and the iodine is trapped.

Figure 2:
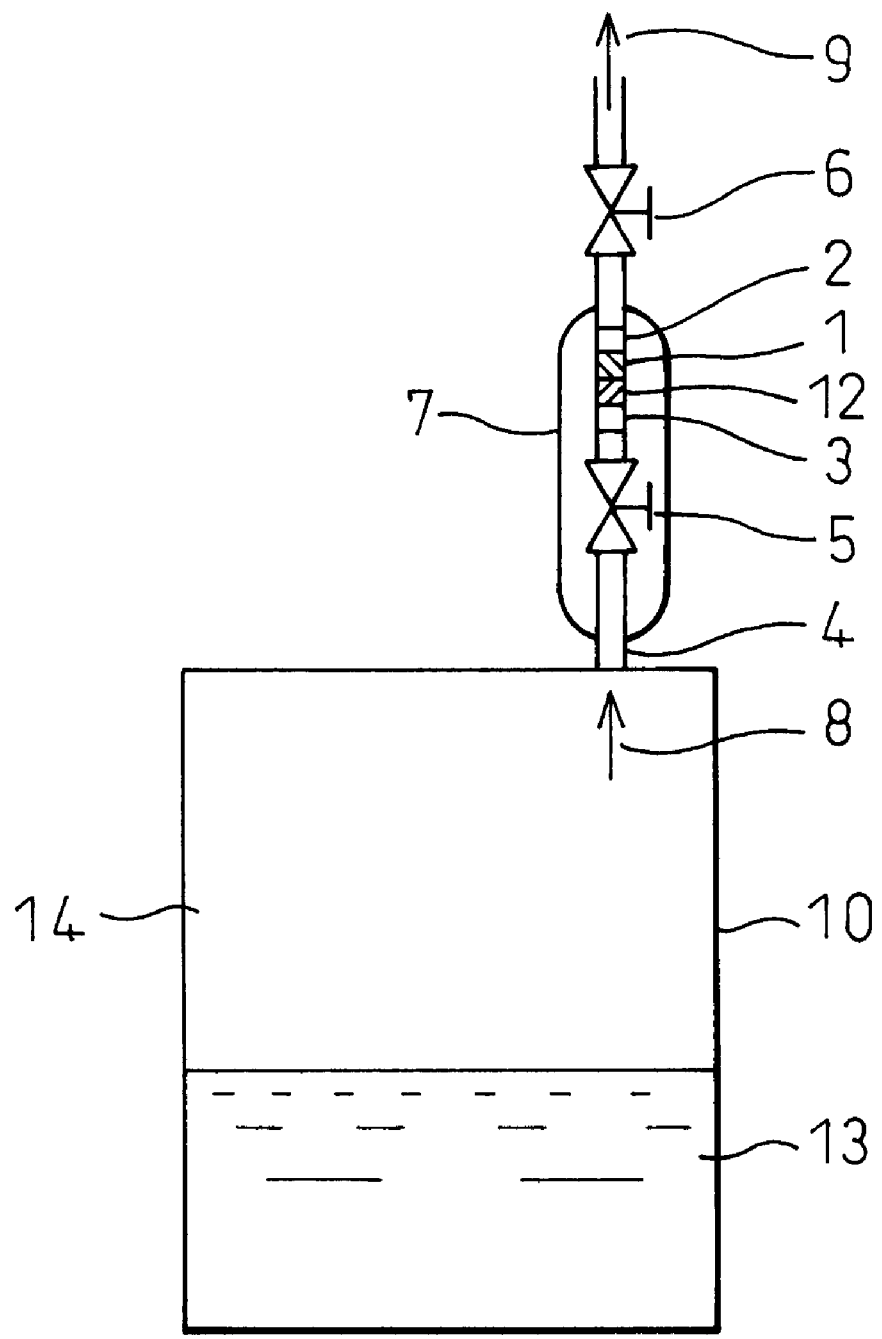
FIG. 2 is a schematic cross-sectional view of an apparatus used in the method of the present invention that combines the use of a separation membrane with a water-impermeable, steam-permeable membrane.

However, in case moisture is present in the phase containing iodine gas as described above, steam liquefies and adheres to the surface of the separation membrane and blocks the pores of the separation membrane. As a result, the passage of gas other than iodine gas such as oxygen is obstructed leading to the possibility of a large volume of water (liquid) being released outside the system. Therefore, as shown in FIG. 2, it is preferable to combine the separation membrane with the use of a membrane that allows the passage of steam but does not allow the passage, of water in order to prevent adherence of steam to the separation membrane. In FIG. 2, reference numerals 1 through 10 are the same as those indicated in FIG. 1. Reference numeral 12 indicates a membrane that is impermeable to water but is permeable to steam. This membrane is, for example, a Coadex (product name) filter having a pore size of 2 μm. Reference numeral 13 is the above-mentioned solution consisting of iodine, water and hydrogen iodide. Reference numeral 14 is air. After the inside temperature of the container reaches 160° C., valves 5 and 6 are opened. Even if gas is collected, iodine gas is not detected in the output gas and iodine gas trapping effects are observed. In addition, the pressure before the valves are opened is 0.5 MPa. Although outlet gas is, collected with the valves open until the pressure drops to 0.3 MPa, there is no passage of water through the membrane. On the other hand, in the case of not combining the use of water-impermeable, steam-permeable membrane 12 and using separation membrane 1 only, water is observed to pass through the membrane at a pressure of 0.35 MPa.

Figure 3:
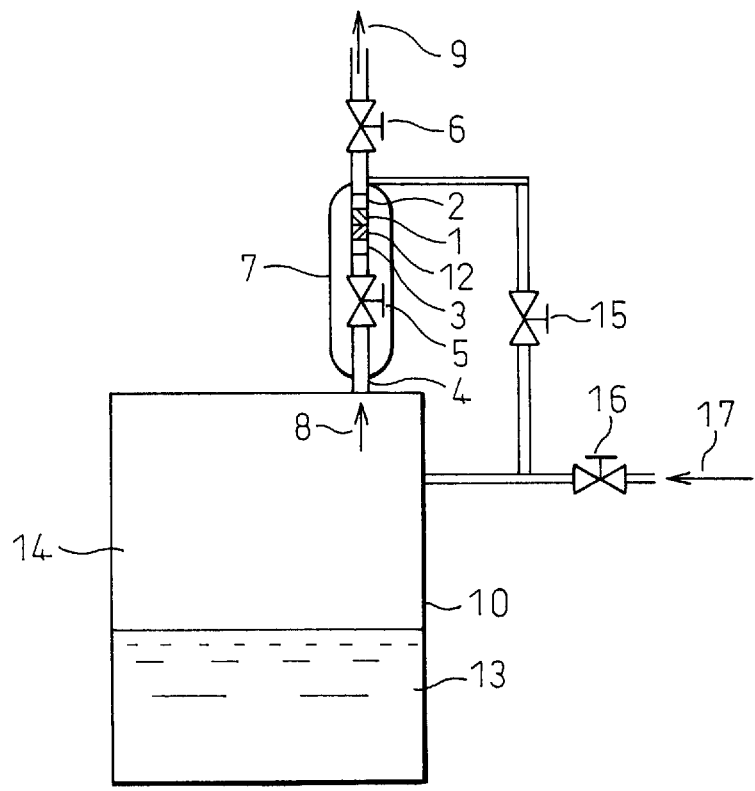
FIG. 3 is a schematic cross-sectional view of an apparatus used in the method of the present invention that is equipped with a means for circulating steam containing iodine in a reaction system.

According to the constitution shown in FIG. 2, since steam passes through the membrane while the passage of water out of the system is prevented, steam containing iodine and hydrogen iodide is also able to pass through the membrane. In order to efficiently utilize this iodine and hydrogen iodide, it is preferable that the steam that passes through the membrane be cooled in order to liquefy and reflux to the reaction container. Namely, as shown in FIG. 3, after the inside temperature of the container reaches 160° C., valves 5 and 6 are opened and the gas is collected. At this time, since steam containing iodine passes through membranes 12 and 1, after collecting the steam by opening valve 15, valve 15 is closed after which valve 16 is opened allowing high-pressure nitrogen or other inert gas 17 to flow. As a result, this steam containing iodine is forcibly refluxed to container 10. Iodine gas is not detected in outlet gas 9 and iodine gas trapping effects are observed.

Figure 4:
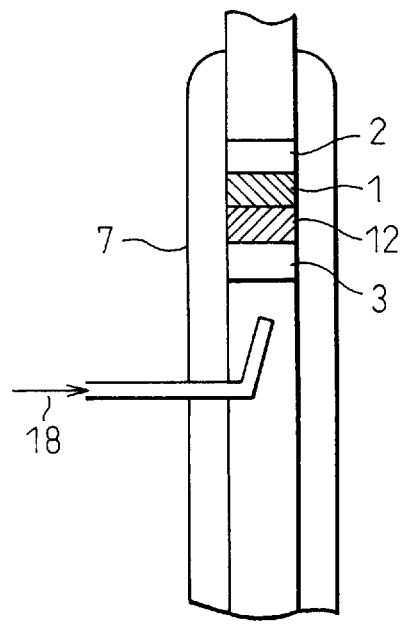
FIG. 4 is a schematic cross-sectional view showing a means for blowing inert gas onto a separation membrane.

As shown in FIG. 2, even if the separation membrane is combined with the use of a water-impermeable membrane, adhesion of water to the membrane cannot be completely prevented. Therefore, it is preferable to prevent adhesion of moisture to the membrane surface by blowing an inert gas such as nitrogen onto the surface of the upstream side of this membrane. Namely, as shown in FIG. 4, nitrogen gas 18 is continuously blown towards the surface on the upstream side of the membrane by adding, for example, 0.05 MPa of pressure to the inside of the system, the valves are opened and the outlet gas is collected. As a result of employing this constitution, iodine gas can be efficiently separated without the adherence of moisture to the membrane.

Moreover, in the case of separating iodine gas with a separation membrane, clogging of the separation membrane may occur due to adherence of iodine when the iodine gas is cooled in this separation membrane. For example, in the system shown in FIG. 2, after placing a solution containing 5 g of iodine, 90 g of water and 5 g of 47% hydrogen iodide in a sealed container and raising the inside temperature of the container to 160°, the valves are opened and the gas is discharged. Next, gas consisting of 50% nitrogen and 50% carbon dioxide is allowed to enter the system followed by heating. After the temperature reaches 160° C., the valves are again opened and the gas is discharged. Normally, when this procedure is repeated about 10 times, gas is no longer discharged arid when the separation membrane is removed and examined, iodine is found to have adhered to the membrane surface. Therefore in order to prevent this clogging of the membrane, steam is passed through the membrane from the downstream side towards the upstream side. As a result, even if the above-mentioned procedure is repeated 20 times, there are no abnormalities observed in the discharge of gas, and there are also no abnormalities in the separation membrane. In addition, by allowing steam to pass through the membrane in this manner, retention of phase components in the pores of the separation membrane when this apparatus is not in use is prevented, thereby making it possible to prevent clogging due to solidification of iodine.

According to the present invention, as shown in the above-mentioned formula (1), in a method of producing oxygen and hydrogen by chemically reacting halogen and water, in the case of using iodine for the halogen, the reaction is allowed to proceed while removing oxygen or hydrogen without releasing iodine from the reaction system, and this reaction can be carried out continuously.

What is claimed is:

1. A method of separating iodine gas by passing a phase containing iodine gas through a hydrophobic separation membrane containing pores having a pore diameter of 1 nm to 60 µm, retaining iodine gas on an upstream side of a flow of said phase in said separation membrane, and removing the phase from which iodine gas has been removed from a downstream side of said separation membrane.

2. The method as set forth in claim 1 wherein the pore diameter of said separation membrane is 1 to 3 µm.

3. The method as set forth in claim 1 wherein a surface contact angle of a hydrophobicity of said separation membrane is at least 90 degrees.

4. The method as set forth in claims 1, 2 or 3 wherein a water-impermeable, steam-permeable membrane is used in addition to said separation membrane.

5. The method as set forth in claim 4 wherein an inert gas is blown onto a surface on the upstream side of said separation membrane.

6. The method as set forth in claim 4 wherein steam is passed from the downstream side towards the upstream side of said separation membrane.

7. The method as set forth in claims 1, 2 or 3 wherein an inert gas is blown onto a surface on the upstream side of said separation membrane.

8. The method as set forth in claims 1, 2 or 3 wherein steam is passed from the downstream side towards the upstream side of said separation membrane.

* * * * *